United States Patent
Asher et al.

(10) Patent No.: US 7,941,585 B2
(45) Date of Patent: May 10, 2011

(54) LOCAL SCRATCHPAD AND DATA CACHING SYSTEM

(75) Inventors: David H. Asher, Sutton, MA (US); David A. Carlson, Haslet, TX (US); Richard E. Kessler, Shrewsbury, MA (US)

(73) Assignee: Cavium Networks, Inc., Mountain View, CA (US)

( * ) Notice: Subject to any disclaimer, the term of this patent is extended or adjusted under 35 U.S.C. 154(b) by 0 days.

(21) Appl. No.: 11/015,343

(22) Filed: Dec. 17, 2004

(65) Prior Publication Data

US 2006/0059310 A1 Mar. 16, 2006

Related U.S. Application Data

(60) Provisional application No. 60/609,211, filed on Sep. 10, 2004.

(51) Int. Cl.
*G06F 12/00* (2006.01)
*G06F 13/00* (2006.01)
*G06F 13/28* (2006.01)

(52) U.S. Cl. . 711/101; 711/129; 711/130; 711/E12.001; 711/E12.046

(58) Field of Classification Search .......... None
See application file for complete search history.

(56) References Cited

U.S. PATENT DOCUMENTS

| | | |
|---|---|---|
| 4,415,970 A | 11/1983 | Swenson et al. |
| 4,755,930 A | 7/1988 | Wilson et al. |
| 4,780,815 A | 10/1988 | Shiota |
| 5,091,846 A | 2/1992 | Sachs et al. |
| 5,119,485 A | 6/1992 | Ledbetter et al. |
| 5,155,831 A | 10/1992 | Emma et al. |
| 5,276,852 A | 1/1994 | Callander et al. |
| 5,404,483 A | 4/1995 | Stamm et al. |
| 5,408,644 A | 4/1995 | Schneider et al. |
| 5,590,368 A | 12/1996 | Heeb et al. |
| 5,619,680 A | 4/1997 | Berkovich et al. |
| 5,623,627 A * | 4/1997 | Witt .............................. 711/122 |
| 5,737,547 A | 4/1998 | Zuravleff et al. |
| 5,737,750 A * | 4/1998 | Kumar et al. ................. 711/129 |
| 5,742,840 A * | 4/1998 | Hansen et al. ................ 712/210 |

(Continued)

FOREIGN PATENT DOCUMENTS

GB 2378779 A 2/2003

(Continued)

OTHER PUBLICATIONS

Handy, Jim. "The Cache Memory Book." 1998. Academic Press, Inc. Second Edition. pp. 85-86.*

(Continued)

*Primary Examiner* — Matt Kim
*Assistant Examiner* — Matthew R Chrzanowski
(74) *Attorney, Agent, or Firm* — Hamilton, Brook, Smith & Reynolds, P.C.

(57) ABSTRACT

A RISC-type processor includes a main register file and a data cache. The data cache can be partitioned to include a local memory, the size of which can be dynamically changed on a cache block basis while the processor is executing instructions that use the main register file. The local memory can emulate as an additional register file to the processor and can reside at a virtual address. The local memory can be further partitioned for prefetching data from a non-cacheable address to be stored/loaded into the main register file.

20 Claims, 6 Drawing Sheets

U.S. PATENT DOCUMENTS

| | | | |
|---|---|---|---|
| 5,754,819 A | | 5/1998 | Lynch et al. |
| 5,794,060 A | * | 8/1998 | Hansen et al. ............... 712/1 |
| 5,794,061 A | * | 8/1998 | Hansen et al. ............... 712/1 |
| 5,809,321 A | * | 9/1998 | Hansen et al. ............... 712/1 |
| 5,822,603 A | * | 10/1998 | Hansen et al. ............... 712/1 |
| 5,860,158 A | | 1/1999 | Pai et al. |
| 5,890,217 A | | 3/1999 | Kabemoto et al. |
| 5,893,141 A | | 4/1999 | Kulkarni |
| 5,895,485 A | | 4/1999 | Loechel et al. |
| 5,897,656 A | | 4/1999 | Vogt et al. |
| 5,991,855 A | | 11/1999 | Jeddeloh et al. |
| 6,009,263 A | * | 12/1999 | Golliver et al. ............ 703/27 |
| 6,018,792 A | | 1/2000 | Jeddeloh et al. |
| 6,021,473 A | | 2/2000 | Davis et al. |
| 6,026,475 A | * | 2/2000 | Woodman .............. 711/202 |
| 6,065,092 A | | 5/2000 | Roy |
| 6,070,227 A | | 5/2000 | Rokicki |
| 6,125,421 A | | 9/2000 | Roy |
| 6,134,634 A | | 10/2000 | Marshall, Jr. et al. |
| 6,188,624 B1 | | 2/2001 | Zheng |
| 6,226,715 B1 | | 5/2001 | Van Der Wolf et al. |
| 6,279,080 B1 | | 8/2001 | DeRoo |
| 6,408,365 B1 | | 6/2002 | Hosomi |
| 6,438,658 B1 | | 8/2002 | Baliga et al. |
| 6,526,481 B1 | | 2/2003 | Shen et al. |
| 6,546,471 B1 | | 4/2003 | Tarui et al. |
| 6,560,680 B2 | | 5/2003 | Meyer |
| 6,563,818 B1 | | 5/2003 | Sang et al. |
| 6,571,320 B1 | | 5/2003 | Hachmann |
| 6,587,920 B2 | | 7/2003 | Mekhiel |
| 6,598,136 B1 | * | 7/2003 | Norrod et al. ............. 711/165 |
| 6,622,214 B1 | | 9/2003 | Vogt et al. |
| 6,622,219 B2 | | 9/2003 | Tremblay et al. |
| 6,643,745 B1 | | 11/2003 | Palanca et al. |
| 6,647,456 B1 | | 11/2003 | Van Dyke et al. |
| 6,654,858 B1 | | 11/2003 | Asher et al. |
| 6,665,768 B1 | | 12/2003 | Redford |
| 6,718,457 B2 | | 4/2004 | Tremblay et al. |
| 6,725,336 B2 | * | 4/2004 | Cherabuddi ............. 711/129 |
| 6,754,810 B2 | * | 6/2004 | Elliott et al. ............. 712/225 |
| 6,757,784 B2 | | 6/2004 | Lu et al. |
| 6,785,677 B1 | | 8/2004 | Fritchman |
| 6,924,810 B1 | * | 8/2005 | Tischler ................. 345/541 |
| 7,055,003 B2 | * | 5/2006 | Cargnoni et al. .......... 711/135 |
| 7,093,153 B1 | * | 8/2006 | Witek et al. ............. 713/600 |
| 7,209,996 B2 | | 4/2007 | Kohn et al. |
| 7,558,925 B2 | | 7/2009 | Bouchard et al. |
| 7,594,081 B2 | | 9/2009 | Bouchard et al. |
| 2001/0037406 A1 | | 11/2001 | Phibrick et al. |
| 2001/0054137 A1 | * | 12/2001 | Eickemeyer et al. ........ 712/11 |
| 2002/0032827 A1 | * | 3/2002 | Nguyen et al. ............. 711/3 |
| 2002/0099909 A1 | | 7/2002 | Meyer |
| 2002/0112129 A1 | | 8/2002 | Arimilli et al. |
| 2003/0056061 A1 | | 3/2003 | Sherman |
| 2003/0065884 A1 | | 4/2003 | Lu et al. |
| 2003/0067913 A1 | | 4/2003 | Georgiou et al. |
| 2003/0105793 A1 | * | 6/2003 | Guttag et al. ............ 708/625 |
| 2003/0110208 A1 | | 6/2003 | Wyschogrod et al. |
| 2003/0115238 A1 | * | 6/2003 | O'Connor et al. .......... 709/100 |
| 2003/0115403 A1 | | 6/2003 | Bouchard et al. |
| 2003/0172232 A1 | | 9/2003 | Naffziger |
| 2003/0212874 A1 | * | 11/2003 | Alderson ............... 711/170 |
| 2004/0010782 A1 | * | 1/2004 | Moritz .................. 717/151 |
| 2004/0012607 A1 | * | 1/2004 | Witt .................... 345/592 |
| 2004/0059880 A1 | | 3/2004 | Bennett |
| 2004/0073778 A1 | | 4/2004 | Adiletta et al. |
| 2004/0250045 A1 | | 12/2004 | Dowling |
| 2005/0114606 A1 | * | 5/2005 | Matick et al. ........... 711/134 |
| 2005/0138276 A1 | | 6/2005 | Navada et al. |
| 2005/0138297 A1 | * | 6/2005 | Sodani et al. ............ 711/143 |
| 2005/0166038 A1 | * | 7/2005 | Wang et al. ............. 712/226 |
| 2005/0267996 A1 | * | 12/2005 | O'Connor et al. ............ 710/1 |
| 2005/0273605 A1 | * | 12/2005 | Saha et al. ............... 713/166 |
| 2006/0059314 A1 | | 3/2006 | Bouchard et al. |
| 2006/0059316 A1 | | 3/2006 | Asher et al. |
| 2006/0143396 A1 | | 6/2006 | Cabot |
| 2007/0038798 A1 | | 2/2007 | Bouchard et al. |
| 2010/0306510 A1 | * | 12/2010 | Olson et al. ............. 712/218 |

FOREIGN PATENT DOCUMENTS

| | | |
|---|---|---|
| WO | WO 2006/031462 | 3/2006 |
| WO | WO 2006/031551 | 3/2006 |

OTHER PUBLICATIONS

"Microsoft Computer Dictionary," 2002. Microsoft Press, Fifth Edition, p. 466.*

"Double Data Rate SDRAMs operate at 400 MHz" (Oct. 14, 2003).

Jouppi, Norman P., "Cache Write Policies and Performance," WRL Research Report 91/12 (1991).

Gharachorloo, Kourosh, et al., "Architecture and Design of AlphaServer GS320." Ninth International Conference on Architectural Support for Programming Languages and Operating Systems (ASPLOS-IX) (2000).

van Riel, Rik, "Page replacement in Linux 2.4 memory management," Conectiva Inc., pp. 1-10, Retrieved from the Internet, http://web.archive.org/web/20010821013232/http://surriel.com/lectures/linux24-vm.html [retrieved on Jun. 5, 2007].

Stokes, Jon, "A Look at Centrino's Core: The Pentium M" "Instruction decoding and micro-op fusion," http://arstechnica.com/articles/paedia/cpu/pentium-m.ars/4, pp. 1-4, Feb. 25, 2004.

* cited by examiner

I/O Address Format

FIG. 3B

IOBDMA Address Format

LOCAL SCRATCHPAD AND DATA CACHING SYSTEM

RELATED APPLICATION

This application claims the benefit of U.S. Provisional Application No. 60/609,211, filed on Sep. 10, 2004. The entire teachings of the above application are incorporated herein by reference.

BACKGROUND OF THE INVENTION

The use of a cache memory with a processor is well known in the computer art. A primary purpose of utilizing cache memory is to bring the data closer to the processor in order for the processor to operate on that data. It is generally understood that memory devices closer to the processor have faster data access times than memory devices farther away on the data path from the processor. However, there is a cost trade-off in utilizing faster memory devices. The faster the data access, the higher the cost to store a bit of data. Accordingly, a cache memory tends to be much smaller in storage capacity than main memory, but is faster in accessing the data.

A characteristic common to most Reduced Instruction Set Computer (RISC) architectures is the use of a load/store architecture. That is, memory can only be accessed by load and store instructions. All other operations are performed on data stored in processor registers (register file). This approach separates the accessing of memory from data manipulation operation, thereby allowing the complier to schedule loads to the processor registers to avoid pipeline stalls.

Typically, a RISC processor includes a simple instruction issue and register dependency logic that only allows one outstanding cache miss. A cache miss is a request to read from memory which cannot be satisfied from the cache, for which the main memory has been consulted. This logic reduces the area, cost, and power consumption of the processor. An outstanding cache miss means the cache memory can continue to be accessed by other instructions until a second miss occurs. That is, all further accesses to the cache memory are stalled until the first outstanding cache miss has been resolved.

Another characteristic common to most RISC architectures is the use of virtual memory (addresses) to access memory. The virtual memory addresses are translated (mapped) to physical (real) addresses for example, through a memory management unit. The purpose of virtual memory is to enlarge the address space, the set of addresses a processor can utilize.

SUMMARY OF THE INVENTION

The present invention provides a mechanism for dynamically partitioning an internal data cache in a processor to provide a scratchpad/local memory within the data cache. The scratchpad/local memory can be used to extend the processor's register set or provide addressable local memory.

An embodiment includes a processor having a main register file and a data cache. The data cache can be partitioned to include a local memory, the size of which can be dynamically changed on a cache block basis while the processor is executing instructions that use the main register file. The local memory can act as an additional register file to the processor, and it resides at a virtual address. A load/store instruction can access the virtual address of the local memory when the load/store instruction's effective virtual address matches the virtual address of the local memory. Data can be moved from the local memory to the main register file using only a single (load) instruction. Data can be moved from the main register file to the local memory using only a single (store) instruction. These single instructions are loads/stores that can use a constant base address, together with a (possibly negative) offset. In one embodiment, the capability (input output bridge direct memory access or IOBDMA) to fetch data into the local memory is provided. IOBDMA may also execute in a single instruction.

In another embodiment, the RISC processor can use register base +16-bit signed constant offset addressing, and can include a register (r0) that gives a zero base address. The data transfers between the local memory and the scratchpad may be signed or unsigned, and can be any width allowed by the loads/stores in the instruction set: 8-bits (byte), 16 bits (half-word), 32-bits (word), or 64-bits (double-word).

In another embodiment, the processor can include a plurality of processors, wherein the plurality of processors can comprise a network processor.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
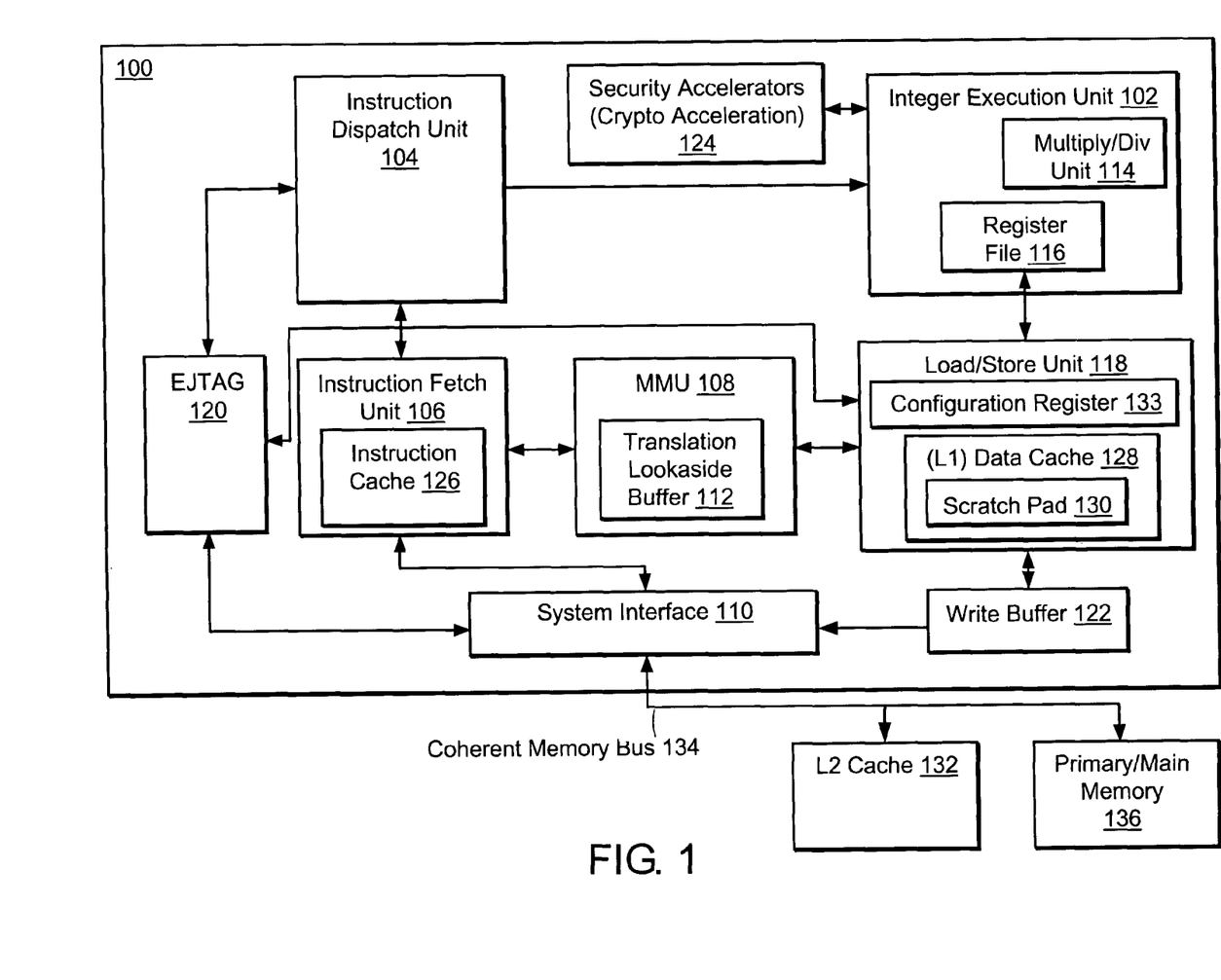
FIG. 1 is a block diagram of a Reduced Instruction Set Computing (RISC) processor according to the principles of the present invention.

A processor is a central processing unit (CPU) that interprets and executes instructions. FIG. 1 is a block diagram of a Reduced Instruction Set Computing (RISC) processor 100 according to the principles of the present invention.

The processor 100 includes an Execution Unit 102, an Instruction dispatch unit 104, an instruction fetch unit 106, a Memory Management Unit (MMU) 108, a system interface 110, a load/store unit 118, a write buffer 122, and security accelerators 124. The processor core also includes an EJTAG interface 120 allowing debug operations to be performed. The system interface 110 controls access to external memory, that is, memory external to the processor 100 such as, external (L2) cache memory 132.

The Execution unit 102 includes a multiply unit 114 and at least one register file (main register file) 116. The multiply unit 114 has a 64-bit register-direct multiply. The Instruction fetch unit 106 includes instruction cache (ICache) 126. The load/store unit 118 includes a data cache 128. A portion of the data cache 128 can be reserved as scratchpad/local memory 130. In one embodiment, the instruction cache 126 is 32K bytes, the data cache 128 is 8 K bytes and the write buffer 122 is 2 K bytes. The Memory Management Unit 108 includes a Translation Lookaside Buffer (TLB) 112.

In one embodiment, the processor 100 includes a crypto acceleration module (security accelerators) 124 that include cryptography acceleration for Triple Data Encryption standard (3DES), Advanced Encryption Standard (AES), Secure Hash Algorithm (SHA-1), Message Digest Algorithm #5 (MD5). The crypto acceleration module 124 communicates by moves to and from the main register file 116 in the Execution unit 102. RSA and the Diffie-Hellman (DH) algorithm are performed in the multiplier unit 114.

A superscalar processor has a superscalar instruction pipeline that allows more than one instruction to be completed each clock cycle by allowing multiple instructions to be issued simultaneously and dispatched in parallel to multiple execution units. The RISC-type processor 100 has an instruction set architecture that defines instructions by which the programmer interfaces with the RISC-type processor. Only load and store instructions access external memory; that is, memory external to the processor 100. In one embodiment, the external memory is accessed over a coherent memory bus 134. All other instructions operate on data stored in the register file 116 in the processor 100. In one embodiment, the processor is a superscalar dual issue processor.

The register file in a 64-bit processor typically includes thirty-two 64-bit registers; one write port, and two read ports. The instruction pipeline is divided into stages, each stage taking one clock cycle to complete. Thus, in a five stage pipeline, it takes five clock cycles to process each instruction and five instructions can be processed concurrently with each instruction being processed by a different stage of the pipeline in any given clock cycle. Typically, a five stage pipeline includes the following stages: fetch, decode, execute, memory and write back.

During the fetch-stage, the instruction fetch unit 106 fetches an instruction from instruction cache 126 in data cache 128 at a location identified by a memory address stored in a program counter. During the decode-stage, the instruction fetched from instruction cache 126 in the fetch-stage is decoded by the instruction dispatch unit 104 and the address of the next instruction to be fetched for the issuing context is computed. During the execute-stage, the Integer Execution unit 102 performs an operation dependent on the type of instruction. For example, the Integer Execution Unit 102 begins the arithmetic or logical operation for a register-to-register instruction, calculates the virtual address for a load or store operation or determines whether the branch condition is true for a branch instruction. During the memory-stage, data is aligned by the load/store unit 118 and transferred to its destination in external memory. During the write back-stage, the result of a register-to-register or load instruction is written back to the register file 116.

The system interface 110 is coupled via the Coherent Memory Bus 134 to external memory, such as L2 cache 132. All store data is sent to L2 cache 132, 136 over the coherent memory bus 134 via a write buffer entry in the write buffer 122.

During a load instruction, if a specified address is not in the data cache 128, then the processor 100 looks for the specified address in an external cache, also called an L2 cache 132. If the address is not in the L2 cache 132 (a cache miss), then the primary/main memory 136 is searched for the address. If the address is not in primary/main memory 136, then the processor 100 searches secondary memory (not shown) through an input/output controller. Examples of secondary memory are hard disks, CD ROMs, etc.

The foregoing discussion of a typical memory hierarchy in a processor makes apparent the desirability of finding an address within the data cache 128. In the absence of a "hit" in the data cache, the address must be located in the external memory (L2 cache 132 or other external memory). Therefore, it is highly desirable to have a high "hit" rate in the internal data cache 128 of a processor 100.

The present invention uniquely addresses the problem of accessing external memory by providing a scratchpad/local memory using a portion of the data cache 128 to extend the size of the register file 116. The scratchpad 130 accelerates packet-processing because data can be stored locally (without being stored in external memory) inside the processor 100 and accessed quickly. Also, the scratchpad memory 130 eliminates all coherent-bus 134 bandwidth for these locations.

There are several features that make the scratch/local 130 memory unique. Unlike past local memories, the size of the scratchpad 130 can vary dynamically on a cache block basis and the size can be dynamically changed based on the type of application being executed. The size of the scratchpad 130 is changed by software by modifying a value stored in a configuration register 133 which can be located in the load/store unit 118. The scratchpad/local memory 130 can be accessed by an ordinary virtual address, yet can always also be accessed as an extended register set, with no more than a single instruction (store/load) ever required to move data between the main register file 116 and the local memory 130. Also, no new instructions are added to the processor's instruction set, to use the local memory 130 as an extended register set, and no registers need be reserved in the main register file 116 to store base addresses.

In an embodiment, the starting (virtual address) of the local memory 130 is 0xFFFFFFFFFFFF8000 and the ending address is 0xFFFFFFFFFFFFBFFF. These addresses are selected for reasons that will be explained below with reference to FIG. 2. Due to the characteristics of the instruction set, any location in the scratchpad/local memory 130 can be accessed without using a register in the main register file 116 to store the base address. The scratchpad/local memory 130 appears to extend the register file, but because the local memory 130 is accessed via ordinary load and store instructions, no new instructions needed to be provided for full flexibility in moving data between the main register file 116 and the local memory 130.

The scratchpad memory 130 is accessed using regular load and store instructions. For example, the LD (load) instruction performs an aligned load of a doubleword (64-bits) and the SD (store) instruction performs an aligned store of a double word (64-bits). For the extended register file usage, single LD and SD memory instructions are used to move data between the main register file 116 and the scratchpad 130 without using a register in the main register file 116 to store a base address.

The instruction mnemonics for a typical RISC load/store instruction is:
    INST, rt, offset (base), where
        INST indicates the instruction type (e.g. "LD" (load) or "SD" (store));
        rt is the destination register;
        offset is the offset value to be added to the address stored in the base register; and
        base is the base register that stores a virtual address.
In the instruction as shown with reference to FIG. 2:
    LD $1, 0x8000($0)
        LD is the INST (202);

Register #1 in the main register file 116 (FIG. 1) is the destination register (rt) (204);
Register #0 in the main register file 116 (FIG. 1) is the base address register (rs) (206); and
0x8000 is the offset value (208).

Figure 2:
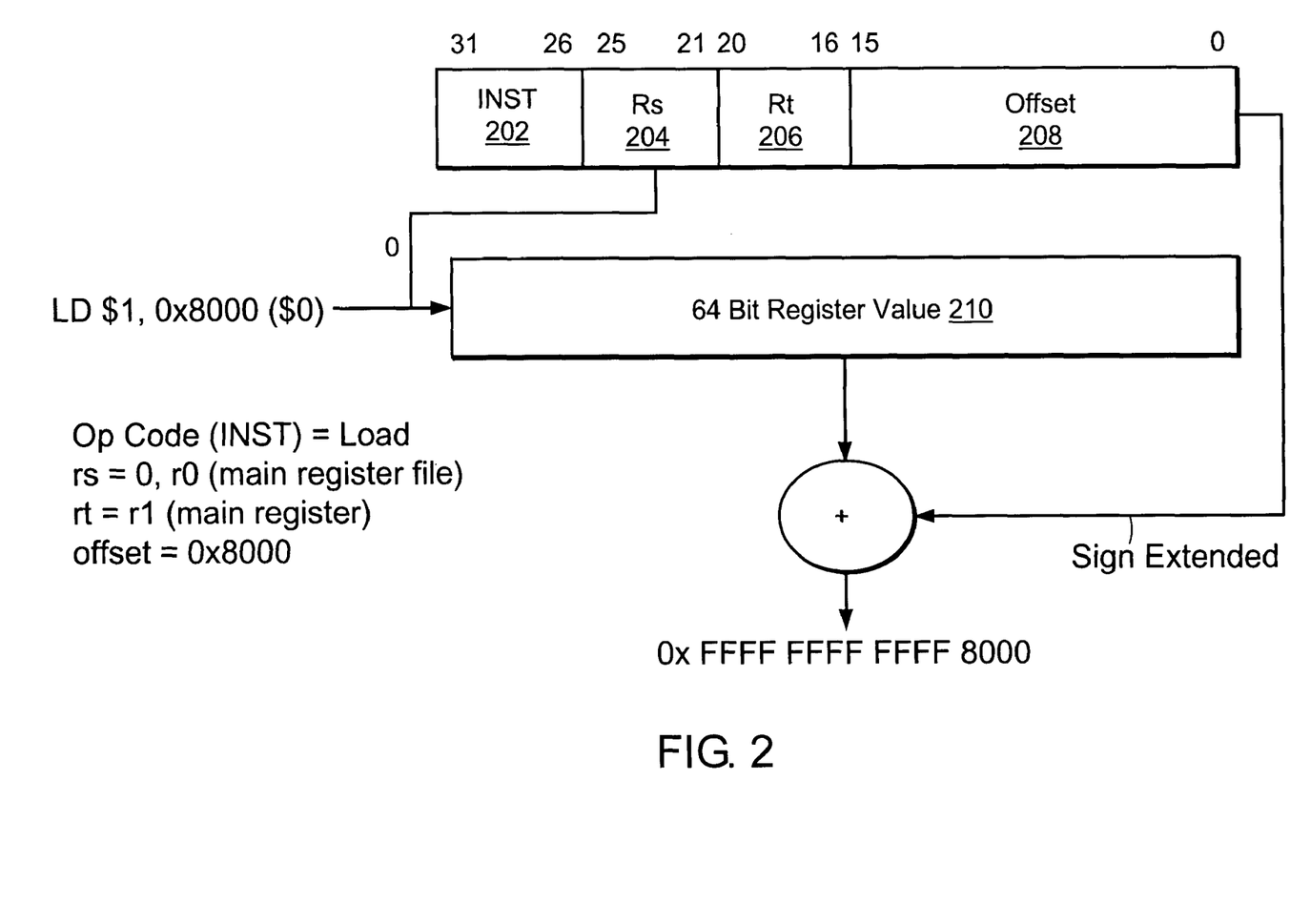
FIG. 2 illustrates a load instruction to a scratchpad/local memory location.

As shown in FIG. 2, to execute this instruction, the processor core sign-extends the offset value 208 of 0x8000 to provide 0xFFFFFFFFFFFF8000. This sign extended value is added to the value stored in the base register 206. The base register 206 in this case is $0, which is designated by the instruction set in this example to always give the value zero (that is, r0 in the main register file 116 (FIG. 1). Thus, the address referenced by the LD (i.e. the resulting address) is the sign extended value of the offset, and the LD references virtual address 0xFFFFFFFFFFFF8000 (i.e. the first scratchpad register 130). To complete the execution of the example LD instruction, the processor (100, FIG. 1) copies the contents of scratchpad register 0 into register 1 in the main register file (116, FIG. 1).

Similarly, a store instruction can be used to move data from a register in the main register file 116 into the local scratchpad 130. For example, the instruction:
SD $3, 0x8008($0)
SD is the INST (instruction or OpCode);
Register #3 in the main register file 116 (FIG. 1) is the source register (rt);
Register #0 in the main register file 116 (FIG. 1) is the base address register (rs); and
0x8008 is the offset value.

In the preceding example, the offset value (0x8008) is sign extended to provide 0xFFFFFFFFFFFF8008 and this sign extended value is added to the base register value in register r0, which is zero, producing a resulting virtual address of 0xFFFFFFFFFFFF8008. Thus, this instruction references the second (64-bit) location in the scratchpad (at byte offset 8). To complete the execution of the example SD instruction, the processor 100 copies the contents of register 3 (r3) in the main register file 116 (FIG. 1) into the selected scratchpad location. It should be understood that access to a virtual address of the scratchpad/local memory 130 is granted when a load/store instruction's effective virtual address matches the virtual address of the scratchpad/local memory 130.

The RISC-type processor includes load/store instructions for multiple data widths and signed/unsigned data. Therefore, any load/store instructions can be used, and thus the available registers or memory locations can be 8-bits (byte), 16-bits (Halfword), 32-bits (word), or 64-bits (Double-word) bits, either signed or unsigned because load and store instructions are used to access the scratchpad memory 130.

The size of the scratchpad 130 is a configuration variable stored within the configuration register 133 in the load/store unit 118. Software can change the size of the scratchpad by changing the configuration variable at any time. This is advantageous as different applications may require more or less scratchpad space. For example, general packet processing might require only about 48 double-words, while an application that computes a large modular exponentiation may require about 496 double-words. Software can dynamically adjust the configuration variable to provide the scratchpad size appropriate to the particular application, yet maximize the space available for the data cache 128, to improve the performance of the application.

In many RISC type processors the number of outstanding loads that can be in progress is limited. For example, some processors can only have one outstanding load to the main register file. To increase the number of loads that can be outstanding (i.e., in progress), the scratchpad 130 can be further partitioned to provide an area of data cache for storing prefetched data. This allows data to be prefetched and stored in the scratchpad 130. These prefetches, such as Input Output Bridge Direct Memory Access (IOBDMA) instructions, queue data waiting to be loaded into the register file 116 in the scratchpad 130. Essentially an IOBDMA instruction is an "I/O prefetch" that returns its results into scratchpad/local memory 130.

The present invention allows multiple outstanding loads via IOBDMAs. The IOBDMAs places the result into the local scratchpad 130. The present invention allows the processor (core) to have many outstanding loads, each of which can be a vector load, while not impacting the core's simple instruction issue and register dependency logic. This is because the extra registers in local memory 130 are not scoreboarded like the registers in the main register file 116 registers are. Scoreboarding is a technique for allowing instructions to be executed out of order when these are sufficient resources and no data dependencies. After an IOBDMA instruction is issued (i.e. in response to executing a store instruction that references an IOBDMA address), a SYNCIOBDMA (or SYNC) instruction is executed before using the result of the IOBDMA instruction to guarantee that the IOBDMA results have been deposited into scratchpad/local memory 130. An SYNCIOBDMA instruction essentially delays execution until the results have been deposited into scratchpad/local memory 130. The SYNCIOBDMA (and SYNC) instructions are the only instructions that need to scoreboard the CVMSEG LM locations, so the multiple outstanding loads can be added without adding any complexity to the issue logic of the processor core.

Figure 5:
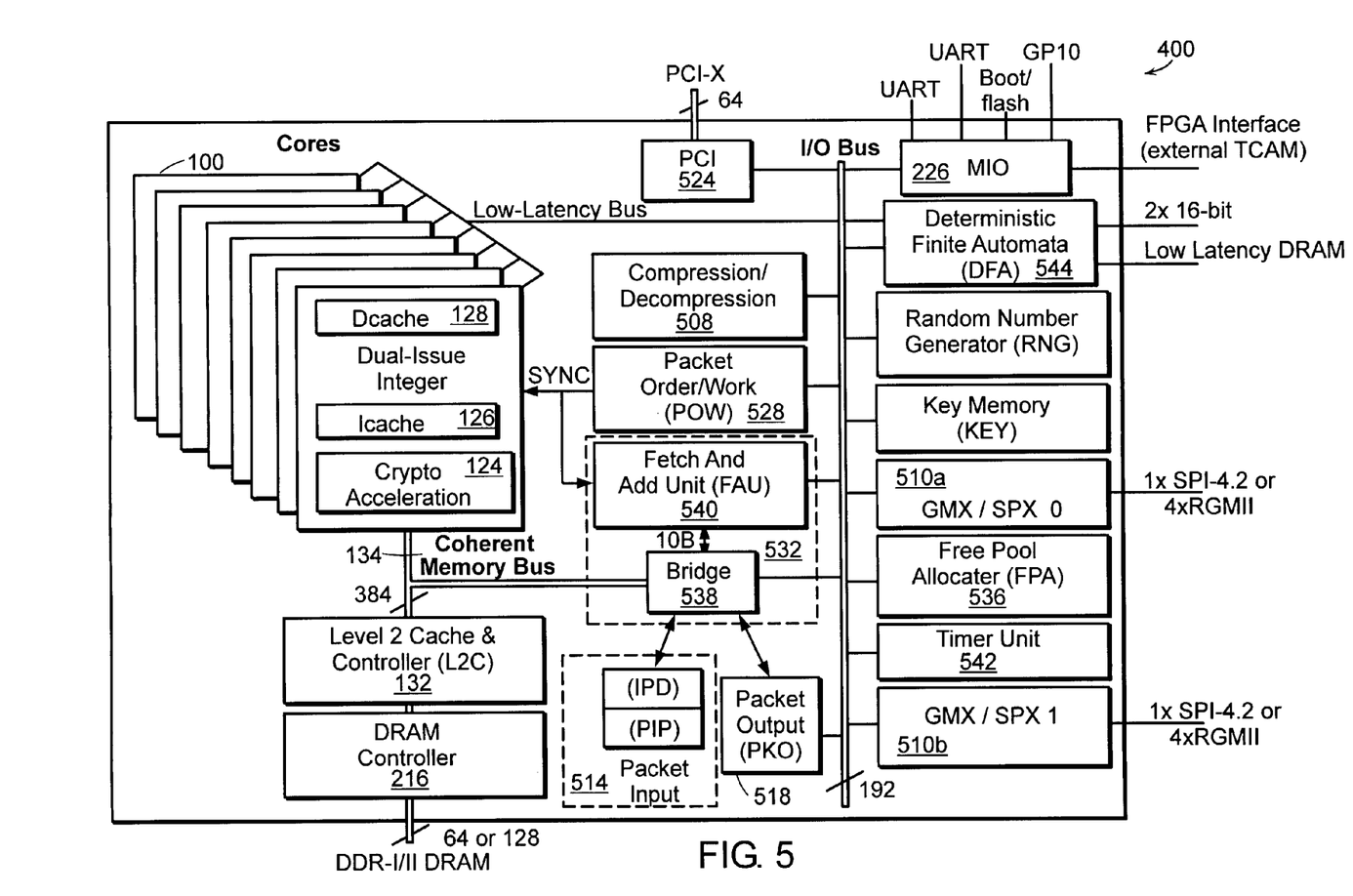
FIG. 5 is a block diagram of the network services processor 400 shown in FIG. 4.

The IOBDMA instruction allows the execution unit 102 (FIG. 1) to load information from I/O units to the processor 100, e.g. the processor can be included in a network processor that includes a packet order/work (POW) Unit (FIG. 5, 528) without stalling the execution unit 102. This increases performance in many circumstances. For example, the IOBDMA instruction can be used to request work from the POW unit 528 (FIG. 5).

Figure 3A:
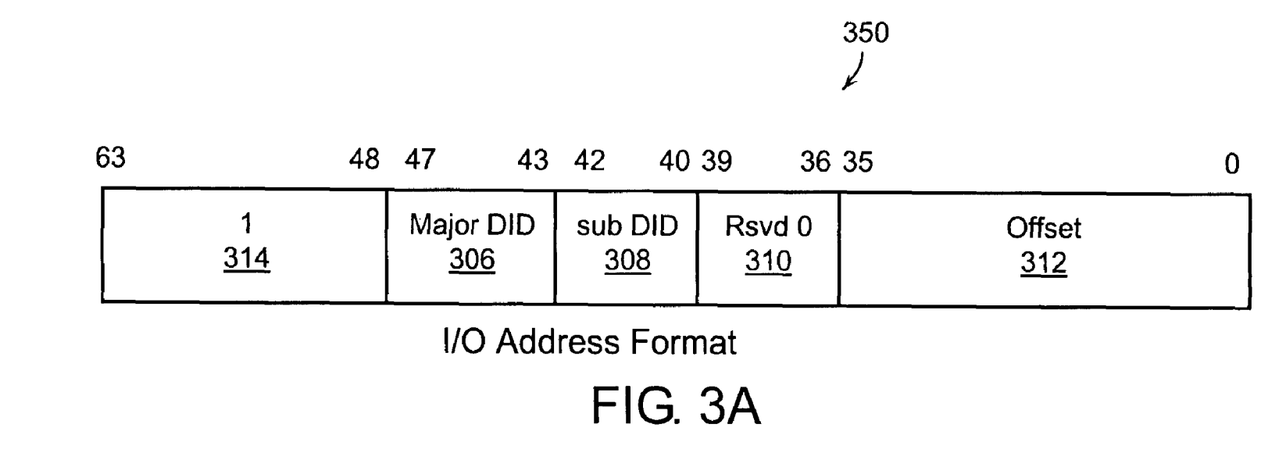
FIG. 3A illustrates an I/O address format.
Figure 3B:
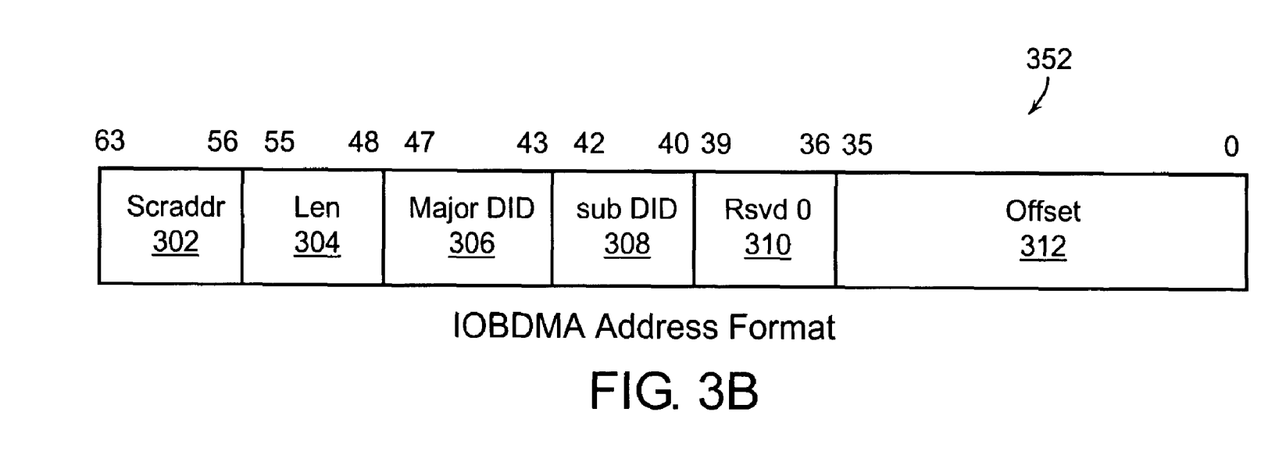
FIG. 3B illustrates an IOBDMA address format.

FIG. 3A shows the format of an I/O physical address from the processor 100. IOBDMA instructions are actually store instructions whose store data format is shown in FIG. 3B. The IOBDMA format is described as follows:

scraddr (302)—A (64-bit word) scratchpad memory location where the load/store unit 118 puts the result. The corresponding memory location starting address is: 0xFFFFFFFFFFFF8000+(8*scraddr) (8 Bits <63:56> e.g. stores, where the starting address=FF . . . 8000);

len (304)—The number of 64-bit words in the result. The results are stored sequentially in memory locations from the starting address indicated by scraddr;

Major DID (306)—Directs the store request to the correct I/O unit in a network processor, such as POW unit 528, as with a normal physical address;

Sub DID (308)—Directs the request within the I/O unit, e.g. POW Unit 528;

Rsvd (310) is not used; and offset (312)—Interpreted by the I/O unit coupled to an I/O Bus as with offset for a normal physical address.

The I/O address format 350 (FIG. 3A) is essentially the same as the IOBDMA address format 352 (FIG. 3B) except the length (314) is always equal to one.

An IOBDMA store causes an I/O Bus transaction using the Major DID 306 and offset 312. This transaction is similar to a transaction created to service an I/O load. The IOBDMA does not stall the processor and can return a vector of 64-bit words.

Figure 3C:
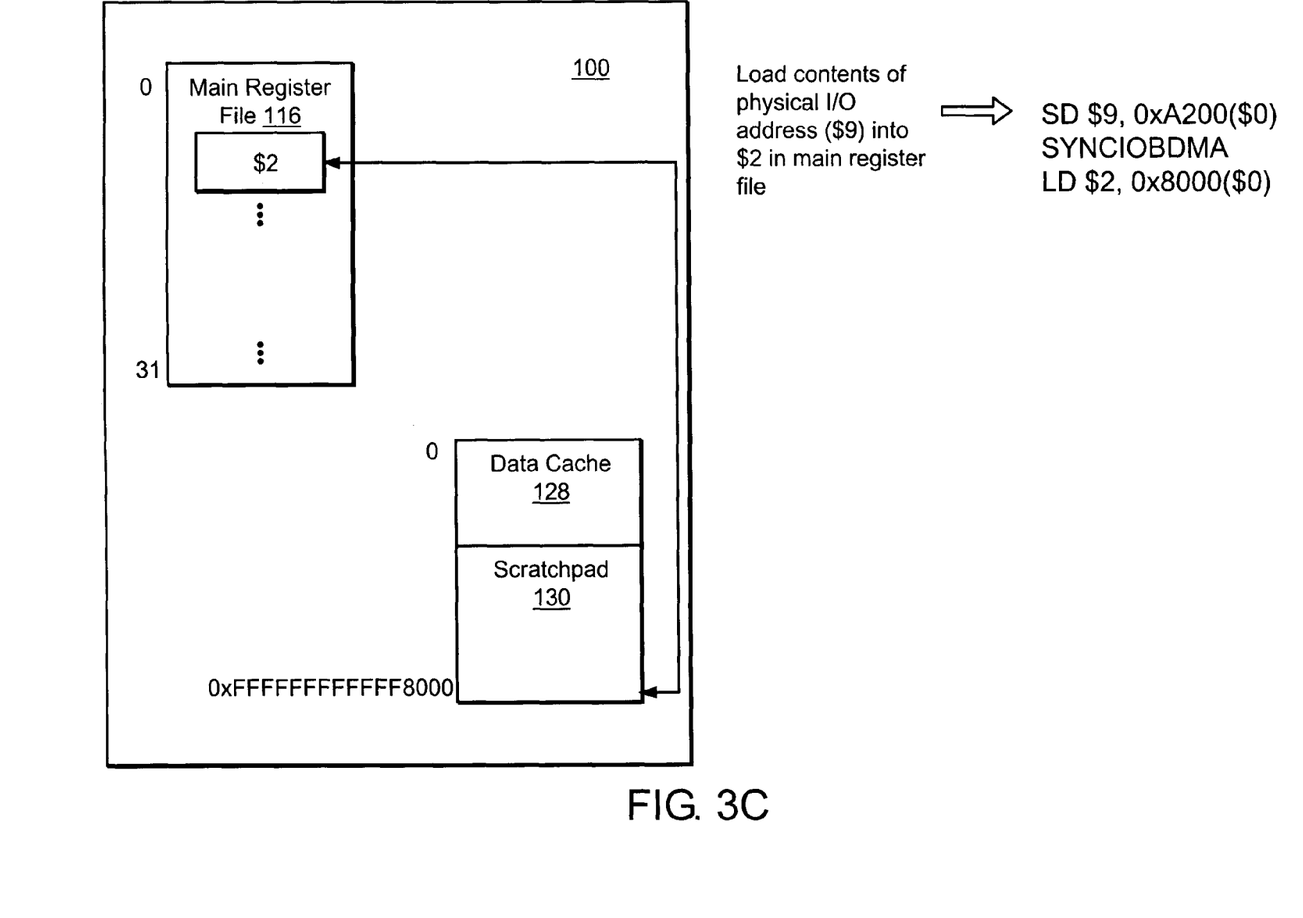
FIG. 3C illustrates execution of an IOBDMA instruction.

FIG. 3C shows an example of the use of an IOBDMA to load an IO address according to the present invention. Register ($9) in the main register file 116 stores the physical address of an I/O location. To load the contents of the I/O address into register 2 ($2) in the main register file 116 using IOBDMA, the following instruction sequence is used:

SD $9, 0xA200($0)
SYNCIOBDMA
LD $2, 0x8000($0)

The "SD $9, 0xA200($0)" initiates the IOBDMA to the I/O address stored in register 9 ($9). When the processor 100 receives a store instruction to this 0xFFFFFFFFFFFFA200 virtual address, it executes an IOBDMA. The store data (stored in r9) contains the address to reference (major did 306, sub did 308, rsvd 310, offset 312; FIG. 3A) in bits 47:0, the length 304 of the operation (in 64-bit words: len 30, FIG. 3B) in bits 55:48, and the (64-bit) scratchpad location 302 (FIG. 3A) in bits 63:56. A physical I/O address 350 has bits 63:48 set to 1, so len is set to 1 and scraddr is 0. Consequently, the IOBDMA places a single 64-bit result into the first scratchpad location. The "SYNCIOBDMA" instruction delays execution of the load instruction (LD) until the IOBDMA result is stored into the first scratchpad register. Then, the load instruction, that is "LD $2, 0x8000($0)" copies the result stored in the first scratchpad location (0xFF . . . 8000) into register 2 ($2) in the main register file 116.

Figure 4:
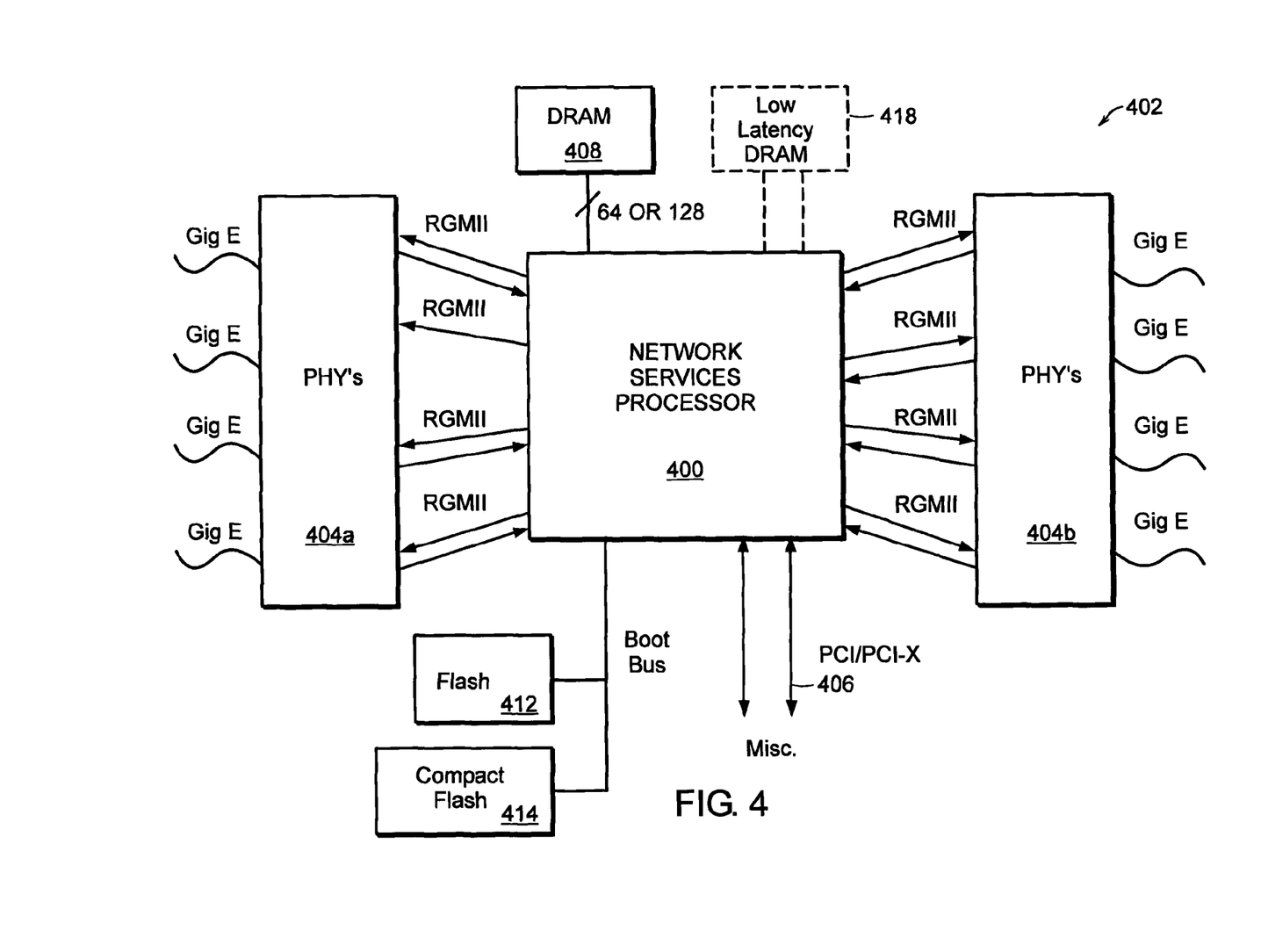
FIG. 4 is a block diagram of a security appliance including a network services processor including at least one RISC processor shown in FIG. 1.

FIG. 4 is a block diagram of a security appliance 402 including a network services processor 400 including at least one processor 100 shown in FIG. 1;

The security appliance 402 is a standalone system that can switch packets received at one Ethernet port (Gig E) to another Ethernet port (Gig E) and perform a plurality of security functions on received packets prior to forwarding the packets. For example, the security appliance 402 can be used to perform security processing on packets received on a Wide Area Network prior to forwarding the processed packets to a Local Area Network.

The network services processor 400 includes hardware packet processing, buffering, work scheduling, ordering, synchronization, and coherence support to accelerate all packet processing tasks. The network services processor 400 processes Open System Interconnection network L2-L7 layer protocols encapsulated in received packets.

The network services processor 400 receives packets from the Ethernet ports (Gig E) through the physical interfaces PHY 404a, 404b, performs L7-L2 network protocol processing on the received packets and forwards processed packets through the physical interfaces 404a, 404b or through the PCI bus 406. The network protocol processing can include processing of network security protocols such as Firewall, Application Firewall, Virtual Private Network (VPN) including IP Security (IPSEC) and/or Secure Sockets Layer (SSL), Intrusion detection System (IDS) and Anti-virus (AV).

A Dynamic Random Access Memory (DRAM) controller in the network services processor 400 controls access to an external DRAM 408 that is coupled to the network services processor 400. The DRAM 408 is external to the network services processor 400. The DRAM 408 stores data packets received from the PHYs interfaces 404a, 404b or the Peripheral Component Interconnect Extended (PCI-X) interface 406 for processing by the network services processor 400.

The network services processor 400 includes another memory controller for controlling Low latency DRAM 418. The low latency DRAM 418 is used for Internet Services and Security applications allowing fast lookups, including the string-matching that may be required for Intrusion Detection System (IDS) or Anti Virus (AV) applications.

FIG. 5 is a block diagram of the network services processor 400 shown in FIG. 4. The network services processor 400 delivers high application performance using at least one processor core 100 as described in conjunction with FIG. 1. Network applications can be categorized into data plane and control plane operations. Each of the processor cores 100 can be dedicated to performing data plane or control plane operations. A data plane operation includes packet operations for forwarding packets. A control plane operation includes processing of portions of complex higher level protocols such as Internet Protocol Security (IPSec), Transmission Control Protocol (TCP) and Secure Sockets Layer (SSL). A data plane operation can include processing of other portions of these complex higher level protocols. Each processor core 100 can execute a full operating system, that is, perform control plane processing or run tuned data plane code, that is perform data plane processing. For example, all processor cores can run tuned data plane code, all processor cores can each execute a full operating system or some of the processor cores can execute the operating system with the remaining processor cores running data-plane code.

A packet is received for processing by any one of the GMX/SPX units 510a, 510b through an SPI-4.2 or RGM II interface. A packet can also be received by the PCI interface 524. The GMX/SPX unit performs pre-processing of the received packet by checking various fields in the L2 network protocol header included in the received packet and then forwards the packet to the packet input unit 514.

The packet input unit 514 performs further pre-processing of network protocol headers (L3 and L4) included in the received packet. The pre-processing includes checksum checks for Transmission Control Protocol (TCP)/User Datagram Protocol (UDP) (L3 network protocols).

A Free Pool Allocator (FPA) 536 maintains pools of pointers to free memory in level 2 cache memory 132 and DRAM. The input packet processing unit 514 uses one of the pools of pointers to store received packet data in level 2 cache memory 132 or DRAM and another pool of pointers to allocate work queue entries for the processor cores.

The packet input unit 514 then writes packet data into buffers in Level 2 cache 132 or DRAM in a format that is convenient to higher-layer software executed in at least one processor core 100 for further processing of higher level network protocols.

The network services processor 100 also includes application specific co-processors that offload the processor cores 100 so that the network services processor achieves high-throughput. The compression/decompression co-processor 508 is dedicated to performing compression and decompression of received packets. The DFA module 544 includes dedicated DFA engines to accelerate pattern and signature match necessary for anti-virus (AV), Intrusion Detection Systems (IDS) and other content processing applications at up to 4 Gbps.

The I/O Bridge (IOB) 532 manages the overall protocol and arbitration and provides coherent I/O partitioning. The IOB 532 includes a bridge 538 and a Fetch and Add Unit (FAU) 540. Registers in the FAU 540 are used to maintain lengths of the output queues that are used for forwarding processed packets through the packet output unit 518. The bridge 538 includes buffer queues for storing information to be transferred between the I/O bus, coherent memory bus, the packet input unit 514 and the packet output unit 518.

The Packet order/work (POW) module 528 queues and schedules work for the processor cores 100. Work is queued by adding a work queue entry to a queue. For example, a work queue entry is added by the packet input unit 514 for each packet arrival. The timer unit 542 is used to schedule work for the processor cores.

Processor cores 100 request work from the POW module 528. The POW module 528 selects (i.e. schedules) work for a processor core 100 and returns a pointer to the work queue entry that describes the work to the processor core 100.

The processor core 100 includes instruction cache 126, Level 1 data cache 128 and crypto acceleration 124. In one embodiment, the network services processor 100 includes sixteen superscalar RISC (Reduced Instruction Set Computer)-type processor cores. In one embodiment, each superscalar RISC-type processor core is an extension of the MIPS64 version 2 processor core.

Level 2 cache memory 132 and DRAM memory is shared by all of the processor cores 100 and I/O co-processor devices. Each processor core 100 is coupled to the Level 2 cache memory 132 by a coherent memory bus 134. The coherent memory bus 134 is the communication channel for all memory and I/O transactions between the processor cores 100, the I/O Bridge (IOB) 532 and the Level 2 cache and controller 132. In one embodiment, the coherent memory bus 134 is scalable to 16 processor cores, supports fully coherent Level 1 data caches 128 with write through, is highly buffered and can prioritize I/O.

The level 2 cache memory controller 132 maintains memory reference coherence. It returns the latest copy of a block for every fill request, whether the block is stored in the L2 cache, in DRAM or is in-flight. It also stores a duplicate copy of the tags for the data cache 128 in each processor core 100. It compares the addresses of cache block store requests against the data cache tags, and invalidates (both copies) a data cache tag for a processor core 100 whenever a store instruction is from another processor core or from an I/O component via the I/O Bridge 532.

After the packet has been processed by the processor cores 100, a packet output unit (PKO) 518 reads the packet data from memory, performs L4 network protocol post-processing (e.g., generates a TCP/UDP checksum), forwards the packet through the GMX/SPC unit 510a, 510b and frees the L2 cache/DRAM used by the packet. The invention has been described for a processor core that is included in a security appliance. However, the invention is not limited to a processor core in a security appliance. The invention applies to ordering of store instructions in any pipelined processor.

While this invention has been particularly shown and described with references to preferred embodiments thereof, it will be understood by those skilled in the art that various changes in form and details may be made therein without departing from the scope of the invention encompassed by the appended claims.

What is claimed is:

1. A RISC processor, comprising:
   a main register file that is accessed using instructions described by instruction mnemonics; and
   a data cache, the data cache partitioned to include a local memory, the local memory residing at a virtual address within the data cache, the size of the local memory dynamically changed on a cache block basis while the processor is executing instructions that use the main register file;
   wherein the local memory emulates as an additional register file to the processor and data is moved between the main register file and the additional register file using a single instruction described by the same instruction mnemonics; wherein a single load/store instruction is used to move data between the local memory and the main register file.

2. The processor of claim 1, wherein a load/store instruction has access to the virtual address of the local memory when the load/store instruction's effective virtual address matches the virtual address of the local memory.

3. The processor of claim 1, wherein the single instruction utilizes a register in the main register file which gives a zero base address and the RISC processor has register base plus 16-bit signed constant offset addressing.

4. The processor of claim 1, wherein a load instruction uses r0 in the main register file to store a base address.

5. The processor of claim 1, wherein a data width for a data transfer to or from the local memory can be selected from a group consisting of 8-bits (byte), 16 bits (half-word), 32-bits (word), or 64-bits (double-word).

6. The processor of claim 5, wherein the data is signed or unsigned.

7. The processor of claim 1, wherein the local memory is further partitioned for prefetching data from a non-cacheable address to be stored/loaded into a main register file.

8. The processor of claim 7, wherein the prefetched data includes multiple outstanding loads awaiting to be executed is loaded into the main register file.

9. The processor of claim 7, wherein a delay instruction is used to guarantee the prefetched data is deposited into the local memory.

10. The processor of claim 1, further including a plurality of processors.

11. The processor of claim 10, wherein the plurality of processors comprise a network processor.

12. A method of partitioning a data cache, comprising:
    accessing a main register file using instructions described by instruction mnemonics;
    dynamically partitioning the data cache to include a local memory, the local memory residing at a virtual address within the data cache, the size of which can be changed on a cache block basis; and
    wherein the local memory emulates as an additional register file to a processor and data is moved between the main register file and the additional register file using a single instruction described by the same instruction mnemonics;
    wherein partitioning includes uniquely choosing an address to allow for a single load/store instruction used to move data between the local memory address and a main register file address.

13. The method of claim 12, wherein access to a virtual address of the local memory is granted when a load/store instruction's effective virtual address matches the virtual address of the local memory.

14. The method of claim 12, wherein the chosen address gives a value of zero and a negative offset.

15. The method of claim 12, wherein a data width for a data transfer to or from the local memory can be selected from a group consisting of 8-bits (byte), 16 bits (half-word), 32-bits (word), or 64-bits (double-word).

16. The method of claim 15, wherein the data can be signed or unsigned.

17. The method of claim 12, further including partitioning the local memory for prefetching data from a non-cacheable address to be stored/loaded into a main register file.

18. The method of claim 17, wherein the prefetched data includes multiple outstanding loads awaiting to be executed loaded into the main register file.

19. The method of claim 17, wherein a delay instruction is used to guarantee the prefetched data is deposited into the local memory.

20. A partitioned data cache, comprising:
- means for accessing a main register file using instructions described by instruction mnemonics;
- means for dynamically partitioning a local memory of the data cache on a cache block basis, the local memory residing at a virtual address within the data cache; and wherein the local memory emulates as an additional register file to a processor and data is moved between the main register file and the additional register file using a single instruction described by the same instruction mnemonics;

wherein a single load/store instruction is used to move data between the local memory and the main register file.

\* \* \* \* \*